US008595846B1

(12) United States Patent
Etheredge et al.

(10) Patent No.: US 8,595,846 B1
(45) Date of Patent: Nov. 26, 2013

(54) METHOD FOR IDENTIFYING COMPROMISED NETWORK COMPONENTS

(75) Inventors: Corta C. Etheredge, Gambrills, MD (US); Michael T. Midkiff, Red Lion, PA (US); Timmothy B. McShane, Silver Springs, MD (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 2421 days.

(21) Appl. No.: 11/288,794

(22) Filed: Nov. 29, 2005

(51) Int. Cl.
 *G06F 7/04* (2006.01)
(52) U.S. Cl.
 USPC ............................................................ 726/26
(58) Field of Classification Search
 USPC ............................................................ 726/26
 See application file for complete search history.

(56) References Cited

U.S. PATENT DOCUMENTS

| | | | |
|---|---|---|---|
| 4,503,534 A | 3/1985 | Budde et al. | |
| 6,792,546 B1 | 9/2004 | Shanklin et al. | |
| 6,839,850 B1 | 1/2005 | Campbell et al. | |
| 6,910,135 B1 | 6/2005 | Grainger | |
| 6,947,532 B1 | 9/2005 | Marchand et al. | |
| 6,968,377 B1 | 11/2005 | Gleichauf et al. | |
| 2006/0070128 A1* | 3/2006 | Heimerdinger et al. | ........ 726/23 |
| 2007/0050846 A1* | 3/2007 | Xie et al. | ........................ 726/22 |
| 2008/0043686 A1* | 2/2008 | Sperti et al. | .................... 370/338 |

* cited by examiner

*Primary Examiner* — Christopher Brown
(74) *Attorney, Agent, or Firm* — Fay Kaplun & Marcin, LLP

(57) ABSTRACT

Described is a system and method for analyzing, by a plurality of detection algorithms, a data stream, including a plurality of packets, each packet including a source address and a destination address, detecting, by at least one of the detection algorithms, at least one of a specific behavior corresponding to an unwanted activity and generating a record including the source address and the destination address of the data packet in which the specific behavior was identified.

7 Claims, 4 Drawing Sheets

METHOD FOR IDENTIFYING COMPROMISED NETWORK COMPONENTS

BACKGROUND OF THE INVENTION

With respect to network security and the interne, security related data extraction has been hampered by the volume of data that has to be processed and maintained. The core of cyber activity is based on the Internet Protocol (IP) that supports the delivery of data (information, entertainment, voice, etc). The growth of commercial and entertainment cyber activity has outstripped the ability of any enterprise or government agency to control and guide the deployment of new capabilities such as interactive access to information and entertainment programming. Due to this large volume of data and large amount of cyber activity, a need therefore exists to identify previously secure network components that have been compromised and to identify hacking activity efficiently.

SUMMARY OF THE INVENTION

A method for analyzing, by a plurality of detection algorithms, a data stream, including a plurality of packets, each packet including a source address and a destination address, detecting, by at least one of the detection algorithms, at least one of a specific behavior corresponding to an unwanted activity and generating a record including the source address and the destination address of the data packet in which the specific behavior was identified.

A system having a data stream receiving module receiving a data stream and separating the data stream into a plurality of independent data streams, the data stream including a plurality of packets, each packet including a source address and a destination address, a plurality of detectors, each detector receiving one of the independent data streams and each detector including a detection mechanism for a specific behavior, wherein each of the specific behaviors corresponds to an unwanted activity, each detector creating a record when the specific behavior is identified, the record including the source address and the destination address of the data packet in which the specific behavior was identified and a storage medium storing the record.

A system comprising a memory to store a set of instructions and a processor to execute the set of instructions. The set of instructions being operable to send a data stream through a plurality of detection algorithms, each detection algorithm including a detection mechanism for a specific behavior, the data stream including a plurality of packets, each packet including a source address and a destination address, detect, by each of the detection algorithms, the specific behaviors in the data packets, wherein each of the specific behaviors corresponds to an unwanted activity and generate, when a specific behavior is identified, a record including the source address and the destination address of the data packet in which the specific behavior was identified.

DETAILED DESCRIPTION

Figure 1:
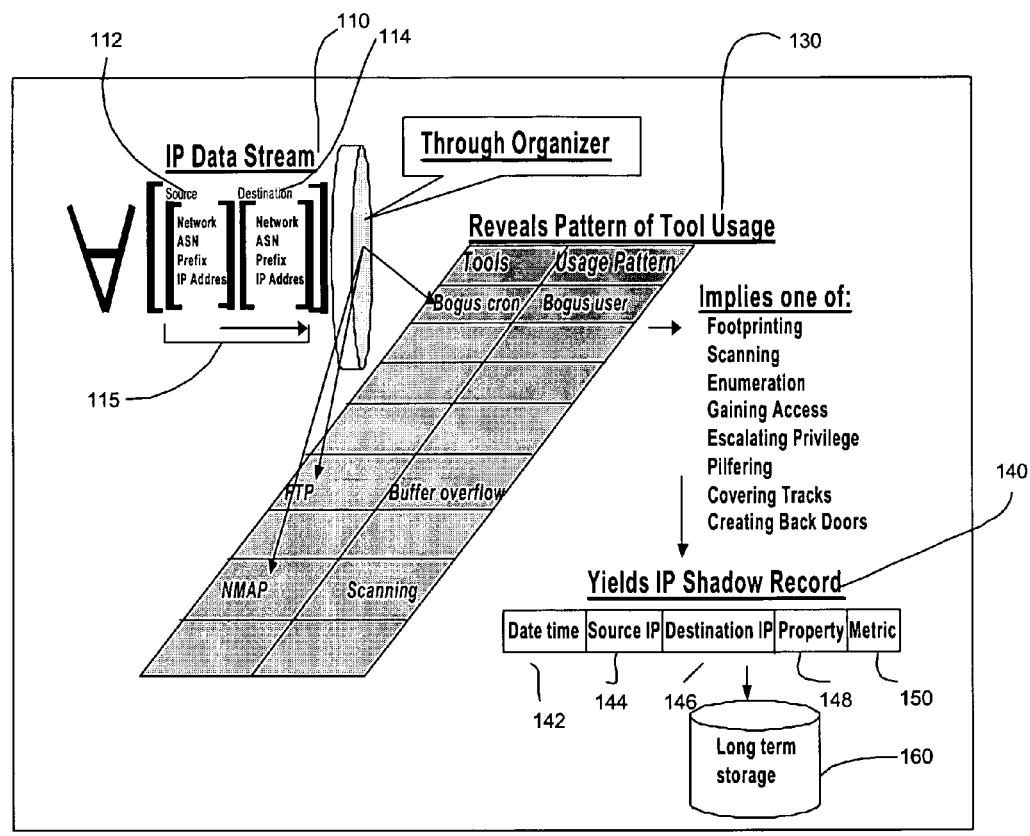
FIG. 1 shows a schematic of the analysis methods for reducing an IP data stream to IP shadow records according to the present invention.

The present invention may be further understood with reference to the following description and the appended drawings, wherein like elements are referred to with the same reference numerals. The exemplary embodiments of the present invention provide for a new internet protocol (IP) data stream processing method. The exemplary embodiments recast the IP data stream in terms of malicious activity in the form of IP Shadow records. The exemplary embodiments reduce the amount of data required for security analysis and provide a rich source for data mining. The exemplary embodiments also provide for near real time of the recast process. IP Shadowing seeks to mitigate the effect of the growing volume of data by reducing the IP data stream to reflect only those observed characteristics that may prove to be malicious.

The IP Shadowing approach introduces a means to monitor components connected to the Internet, to encapsulate information found in the IP data stream, and to assess their potential to be misused to inflict harm. IP Shadowing examines data and voice delivery mechanisms to reduce the data stream to simple records with respect to activity that is potentially malicious. Follow-on analysis of those records provides a rich source of information for cyber defense because of the predictive information embedded in these records. IP Shadowing is an alert system that identifies compromised network components that can be activated remotely at any time.

The present invention structures malicious activity in accordance with the nine methodologies identified in the book "Hacking Exposed: Network Security Secrets & Solutions, Fourth Edition" where the identity of malicious activity is embedded in tools and the way tools are used by hackers. However, those of skill in the art will understand that the present invention may be implemented to detect any type of hacking methodology according to the functionality described herein. In the exemplary embodiments, Internet protocol shadowing searches the data portion of packets for pre-defined patterns associated with the eight methodologies. When the classification scheme data is overlaid with detail from the IP data stream that has been organized by (source, destination) pairs, insight into the status of any community of IP addresses is available with an indication of who in the community has the potential to be exploited.

Table 1 provides a view of the scope of the classification system for hacks and intrusions laid out in 'Hacking Exposed.' The defined range of methodologies is general enough to encompass the full scope of intrusion and hacking activities. The methodologies range from low to high severity (read bottom to top). The column labeled 'Methodology' lists the classes of intrusion and hacking activity. The column labeled 'Objective' addresses the intent of hacking activity within the class. The column labeled 'Tools' lists the computer programs, special user techniques, and command sequences, a hacker may use in attempting to reach the objective. The column "Usage Pattern" lists the common names that have come to be associated with the activity that try to reach the pre-stated objective.

TABLE 1

| Methodology | Objective | Tools | Usage Pattern |
|---|---|---|---|
| Denial of Service | Disable Target | Smurf, land, teardrop, ping of death, etc. | SYN Flood, ICMP techniques, DdoS |
| Creating Back Doors | Ensure Future Access | Cron, at, rc netcat, VNC, Startup folder | Create user accounts, Replace Apps with Trojans, Schedule Batch |
| Covering Tracks | Hide the Break-In | Zap, event logs, rootkits | Clear logs, Hide tools |
| Pilfering | Get User/sys info | Rhosts, user data, configuration files | Evaluate trusts, Search for cleartext Passwords |
| Escalating Privilege | Get Root Privilege | L0phtcrack, getadmin | Password cracking, Known exploits |
| Gaining Access | Break-In | Tcpdump, readsmb, tftp, pwdump2, bind | Buffer overflows, grab password file, eavesdrop |
| Enumeration | Expose Vulnerabilities | Banner grabbing, rpcinfo, dumpACL | List user Accounts, list file shares, identify apps |
| Scanning | Target Assessment | Nmap, fping, icmpenum, f scan | Ping Sweep, port scan, IP scan OS detection |
| Footprinting | Gather Information | Whois, Is-d, Sam Spade, nslookup | Open Source, whois, DNS zone transfer, etc. |

In the IP Shadowing approach, the name of tools, and tool usage patterns that are extracted from the IP data stream are analyzed with respect to an inference technique, described in greater detail below, to determine which Methodology is in use. Information that meets predefined criteria is captured in a construct called an IP Shadow record. The process of capturing information in this way is called encapsulation.

The exemplary embodiments of the present invention provide (with IP Shadowing) a taxonomy for intrusion/hacking. The classifications in 'Hacking Exposed' provide a widely accepted, and highly respected base and backdrop for organizing intrusion/hacking information. The alignment between IP Shadowing and the Anatomy of a Hack is shown in Table 2. Using IP Shadowing requires knowledge of Tools, knowledge of usage patterns, and an IP data stream.

TABLE 2

| Methodology | Objective | Tools |
|---|---|---|
| Denial of Service | Disable Target | Search for actual denial of service exploitation |
| Creating Back Doors | Ensure Future Access | Search packets for unusual user accounts, undocumented batch jobs, Trojans, etc. |
| Covering Tracks | Hide the Break-In | Search packets for rm, del, get, commands |
| Pilfering | Get User/sys info | Search packets for activity that expands trusted status (registry, configuration files, etc.) |
| Escalating Privilege | Get Root Privilege | Examine packet content for password related strings, root prompt, brute force, etc. |
| Gaining Access | Break-In | Examine metadata to uncover buffer overflows involving (source, destination) IP pairs (FTP, HTTP, SNMP, etc.) |
| Enumeration | Expose Vulnerabilities | Examine packet content to find lists of user accounts, lists of file shares, list of directories, SNMP MIBs, etc. |
| Scanning | Target Assessment | Examine source and destination IP addresses and ports in metadata for patterns, SNMP MIBs, etc. |
| Footprinting | Gather Information | Examine packet content for DNS zone transfer, whois, URL access |

IP Shadowing examines the content and metadata (data about data) of the IP data stream. Coupled with knowledge of hacking tools and techniques, IP Shadowing tries to organize tools, usage patterns, and data to determine the methodology in use. The classification scheme or taxonomy provides the framework behind the matching process.

The esoteric nature of hacking works as an advantage. The parameters of a hack are bound by the computer architecture and the vulnerabilities found in the software. There is not much room for variation. Different hackers are forced to use similar techniques to do similar hacks and, consequently, the behavior that IP Shadowing must look for should be predictable and bounded for a given vulnerability.

The properties of (source, destination) pair for the exemplary embodiments will next be described. IP communication requires a connection as defined by the (source, destination) pair. The (source, destination) pair establishes position in a cyber space where the source and destination may be interpreted as the vertical and horizontal axes of a Cartesian coordinate system. When (source, destination) information is combined with the taxonomy discussed above, this information may be used to identify compromised components. As described above, the methodologies described in Table 1 were defined as increasing in severity from the bottom to the top of the table. The assertion of the inference technique of the present invention is that for a given arbitrary collection of source, destination pairs called P and the full set of associated properties, it is possible to determine if P has been compromised, i.e., when the number of observed methodologies exceeds a threshold, it is more likely that the connection has been compromised.

The classification scheme discussed above overlays the connection, and the methodologies may be thought of as attributes of the connection. The progression of hacking activity and the increase in severity as the hack sequence evolves matches well with the taxonomy described above. Thus, as also described above, the inference technique asserts that when the number of observed distinct methodologies exceeds a threshold, it is more likely that that connection has been compromised notwithstanding that most IP connections are not malicious and are characterized by the absence of the methodologies.

A rich view of the problem domain is possible when the methodologies, source, and destination are used as parameters associated with the problem. For example, it is possible to see correlations of a range of sources with a single destination and a range of methodologies. It is possible to consider the frequency histograms of the different methodologies and, it is also possible to do all of the above using date-time as a principle parameter.

The cyber event capture of the present invention is described below. Cyber event capture is the name given to a process of examining the tools and usage patterns embedded in the data and determining if associations are strong enough to match a specific property. It should be noted that for the remainder of this description the terms "methodology" and "property" will be used co-extensively to describe a the hacking methodologies described above. The IP address offers many options for organizing information about machines on the Internet because it identifies computers on the Internet uniquely. Historically, because the addresses are often assigned in country-based blocks, an IP address could often be used to identify the country of origin for a connection. With the growth of multi-national corporations and other entities with worldwide scope, the IP address to country relation has become less reliable.

The IP address is written as a set of four numbers separated by periods (192.0.5.255) where the numbers range from 0-255, and are organized into groups to manage information flowing about the Internet. The primary groups are the Classless Inter-Domain Routing (CIDR) and Autonomous Systems (AS).

Classless Inter-Domain Routing (CIDR) is sometimes referred to as supernetting. CIDR is a way to allocate and specify the Internet addresses used in inter-domain routing more flexibly than with the original system of Internet Protocol address classes. As a result, the number of available Internet addresses has been greatly increased. CIDR is now the routing system used by virtually all gateway hosts on the Internet's backbone network. The Internet's regulating authorities now expect every Internet service provider ("ISP") to use it for routing.

The original Internet Protocol defines IP addresses in four major classes of address structure, Classes A through D. Each of these classes allocates one portion of the 32-bit Internet address format to a network address and the remaining portion to the specific host machines within the network specified by the address. One of the most commonly used classes is (or was) Class B, which allocates space for up to 65,533 host addresses. A company that needed more than 254 host machines but far fewer than the 65,533 host addresses possible would essentially be "wasting" most of the block of addresses allocated. For this reason, the Internet was, until the arrival of CIDR, running out of address space much more quickly than necessary. CIDR effectively solved the problem by providing a new and more flexible way to specify network addresses in routers. (With a new version of the Internet Protocol—IPv6—a 128-bit address is possible, greatly expanding the number of possible addresses on the Internet.

Using CIDR, each IP address has a network prefix that identifies either an aggregation of network gateways or an individual gateway. The length of the network prefix is also specified as part of the IP address and varies depending on the number of bits that are needed (rather than any arbitrary class assignment structure). A destination IP address or route that describes many possible destinations has a shorter prefix and is said to be less specific. A longer prefix describes a destination gateway more specifically. Routers are required to use the most specific or longest network prefix in the routing table when forwarding packets.

An example of a CIDR network address is 192.30.250.0/18. The "192.30.250.0" is the network address itself and the "18" says that the first 18 bits are the network part of the address, leaving the last 14 bits for specific host addresses. CIDR lets one routing table entry represent an aggregation of networks that exist in the forward path that don't need to be specified on that particular gateway, much as the public telephone system uses area codes to channel calls toward a certain part of the network. This aggregation of networks in a single address is sometimes referred to as a superset.

On the Internet, an autonomous system (AS) is the unit of router policy, either a single network or a group of networks that is controlled by a common network administrator (or group of administrators) on behalf of a single administrative entity (such as a university, a business enterprise, or a business division). An autonomous system is also sometimes referred to as a routing domain. An autonomous system is assigned a globally unique number, sometimes called an Autonomous System Number (ASN).

The Internet community uses CIDR and AS routinely in day-to-day operations. So, in addition to processing information based on the IP address alone, the groupings by CIDR, Prefix, and ASN provide more flexibility for system designers to organize information about networks. Aggregation also reduces the number of active elements the system tracks. For example, a CIDR representation like a.b.0.0/16 identifies 65,536 possible network values as a and b range from 0 to 255 while a representation like a.b.c.0/17 identifies 131072 network addresses. More bits in the CIDR representation mean a finer resolution of network activity. The system designer can incorporate controls in the system that allows the operator to select ranges of addresses of interest and thereby consume fewer resources.

A system administrator with a presence on the Internet has heightened concern about the health of the Autonomous System(s) that constitute his/her domain. For the administrator, it may be meaningful to know that a range of IP addresses have been visited by a particular malicious source. Often information within the domain can be delineated further with the CIDR representation and such functionality would enable the administrator to drill down to get supporting information. The IP Shadowing approach of the present invention takes advantage of the groupings as aggregated by ASN, CIDR, etc.

The user may need to monitor the health of the Internet. The relationship between Autonomous Systems is an effective approach for monitoring Internet activity. Communication via Border Gateway Protocol (BGP-TCP port 179) is used by the Internet to exchange routing information between autonomous systems and thereby manage itself. The IP Shadowing approach can be applied to the entire Internet by organizing information at the aggregation level of autonomous system.

FIG. 1 shows a schematic of the analysis methods for reducing an IP data stream to IP shadow records. The IP data stream 110 includes a source, destination pair 115 including a source IP address 112 and a destination IP address 114. The (source, destination) pair is a tuple (an ordered set of values) of IP addresses. In this example, the tuyple includes Network, ASN, Prefix and LP Address information. The data stream 110 goes through an organizer 120 that reveals a pattern of tool usage 130. From this pattern 130, there is implied one of the following properties: foot-printing, scanning, enumeration, gaining access escalating privilege, pilfering, covering tracks, and creating back doors. This information then yields an IP shadow record 140. The record 140 may include items such as a date time 142, the source IP 144, the destination IP 146, the property 148 and a metric 150 (described in more detail below). This record 140 may then be delivered to long term storage 160. Thus, IP Shadowing uses observed behavioral characteristics of elements in cyber-space to identify and display malicious hacking activity. The properties that are scanned for in each data packet may be increased as the knowledge base of hacking techniques is increased.

Every hacking event begins with the hacker using a tool to interact with target machines on the Internet. An interaction that is mischievous or malicious should fall into one of the methodologies described above. During the interaction, the target (or destination) machine's state can range from exposed to compromised. The cyber event capture process described above documents the analytical steps used to identify the property in use (e.g., Scanning, Gaining Access, Pilfering, etc). Interactions with strong associations may be organized and catalogued to provide the knowledge base for the cyber event capture process. Analytical approaches such as the Proactive Event Detection System (PEDS), Scan Aggregation (SCANAGG), and Worm Detection have been explored and were found to provide strong associations. Analysis approaches using the full content of the IP packets such as looking for key words in context may also be used to provide strong associations.

Figure 2:
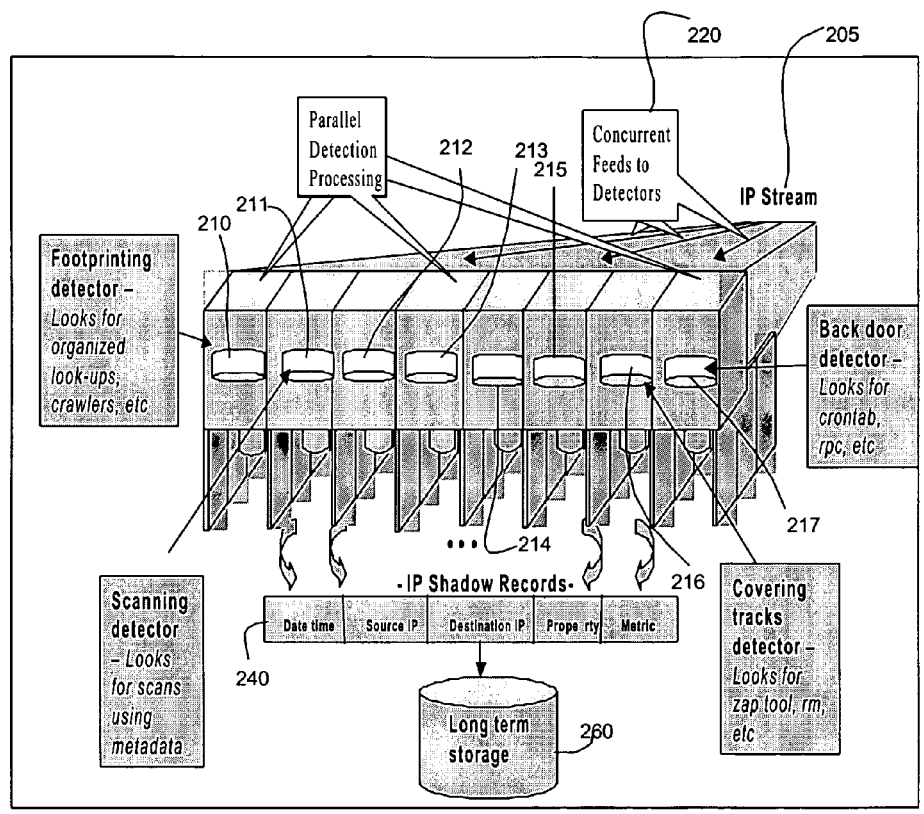
FIG. 2 is a schematic of an architecture including multiple independent hacking methodology detectors according to the present invention.

The IP shadowing feature 200 of the present invention is described below with reference to FIG. 2. The IP data stream 205 may be sent through detection algorithms 210-217 via concurrent feeds 220. Each detection algorithm 210-217 may operate independently with each detection algorithm 210-217 looking for and capturing specific behavior. For example, detection algorithm 210 may be a footprinting detector that looks for organized look-ups, crawlers, etc, and detection algorithm 211 may be a scanning detector that looks for scans using metadata. Similarly, there may be an enumeration detector 212, a gaining access detector 213, an escalating privilege detector 214, a pilfering detector 215. There may also be a covering tracks detector 216 that looks for zap tool, rm, etc., and a backdoor detector 217 that looks for crontab, rpc, etc. The above did not describe all of the functionality of the detection algorithms 211-217, but provided examples of specific detections algorithms. The tables 1 and 2 provide additional examples of specific detection activity that may be used to detect certain properties of hacking. However, as described above, the present invention may be expanded to include other hacking properties as these properties are included in the knowledge base of the provider. Thus, additional detection algorithms may be added, as needed. Furthermore, some of the hacking properties described above may become obsolete because of changes to the Internet. Thus, detection algorithms may change over time.

It should also be noted that the present invention may be implemented on one or more computing devices within the network that is going to be protected. For example, if the herein described functionality is going to be implemented by an ISP, the ISP may implement the described functionality on, for example, a server, a network appliance, a router, a switch, etc. that is provided in the ISP's network. The described functionality may be implemented on a single computing device or may be distributed to multiple devices throughout the network. It will be apparent to those of skill in the art as to specific implementations on various parts of a network, e.g., ISP, customer, VPN, etc.

When multiple independent detectors "fire" for the same (source, destination) pair it will be more likely that the pair has been compromised. For example, if the back door detector 217 and the covering tracks detector 216 both fire for the same source, destination pair in the IP stream 205, this may be a good indication that the pair has been compromised. As will be described in greater detail below, specific patterns of detection firing or weights of detection firing may be used to indicate to the system administrator the severity of the problem. It should be noted that it is preferred that high quality detectors be used to achieve and maintain high confidence in the system. Faults in a detector may cause false positive and negative indications and diminish confidence in the system. From the detectors 210-217, the IP shadow records 240 are produced and sent to long term storage 260.

With this architectural approach, the independent detectors can operate in parallel, concurrently, and in a channelized fashion. Because independent processes generate them, the IP shadow records can be captured and collected with no dependence on anything outside the immediate process. The analysis algorithms may then be run independently, ingest the same IP data, and produce independent assessments of malicious activity. In order to save memory space within the network, it is preferable that IP shadow records are produced only when potentially malicious activity is detected. The IP shadow records are likely to be buffered and forwarded to a central repository where they will be processed periodically. Provided the detectors are responsive and accurate, acts such as building trojans and covering tracks will be captured in the IP shadow records along with the stealthy slow to develop hack.

A property may have an associated metric that specifies the relative value attached to the IP shadow record. The metric could be a single number based on the severity of the property. For example, where an IP shadow record indicates the property of back door detection (a relatively severe form of hacking property), the metric may be a relatively high value. For some IP shadow records, a metric may have several properties that can be combined to produce a single number. For example, an IP shadow record with the property of footprinting may have a relatively low metric value. However, the system may be configured that if there are IP shadow records for the same source, destination pair that indicates footprinting and enumeration, the metric for the combination may be greater than the sum of the metrics for the footprinting and enumeration separately. When the analysis meets a predefined quality and confidence threshold, a record reflecting the result of the analysis may be sent to the IP shadow repository where it is available for mining and other statistical and visualization treatments.

Figure 3:
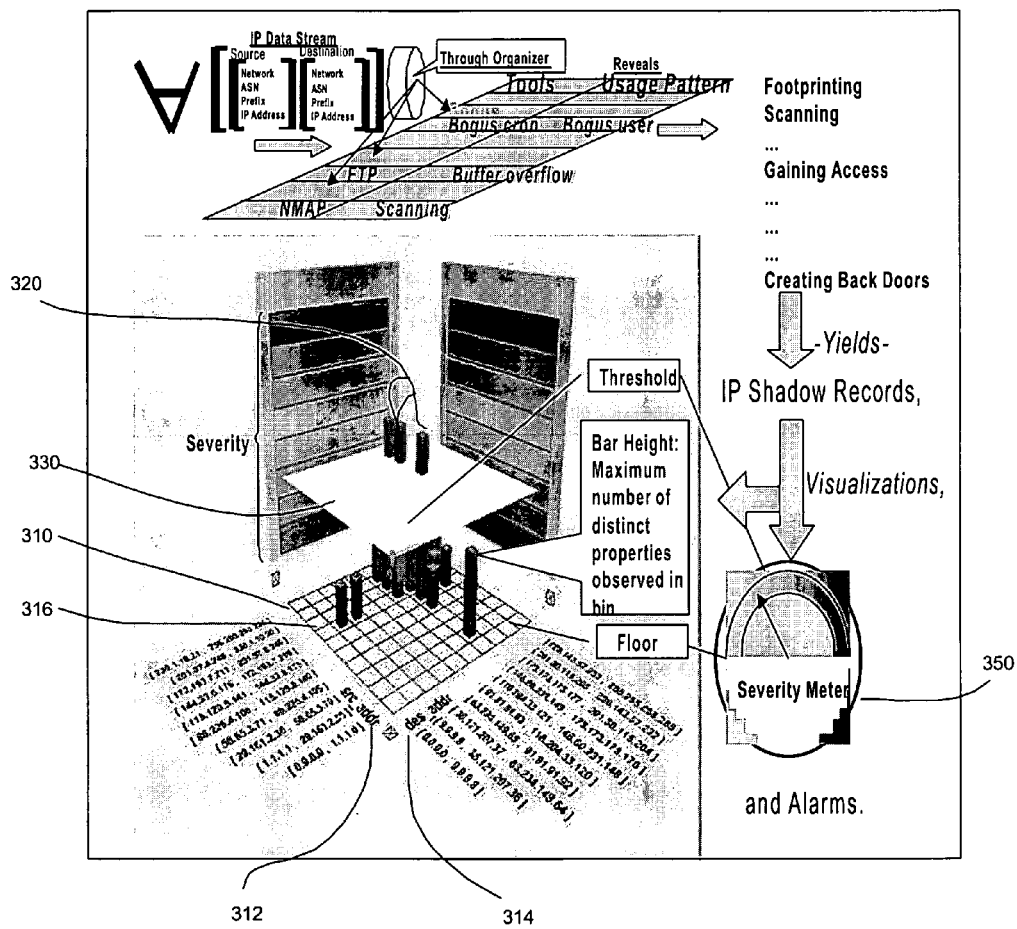
FIG. 3 presents a hypothetical visualization of a situation that juxtaposes the severity level of all connections in the Internet with a conceptual view of the interplay of techniques, tools, and data in cyber event capture according to the present invention.
Figure 4:
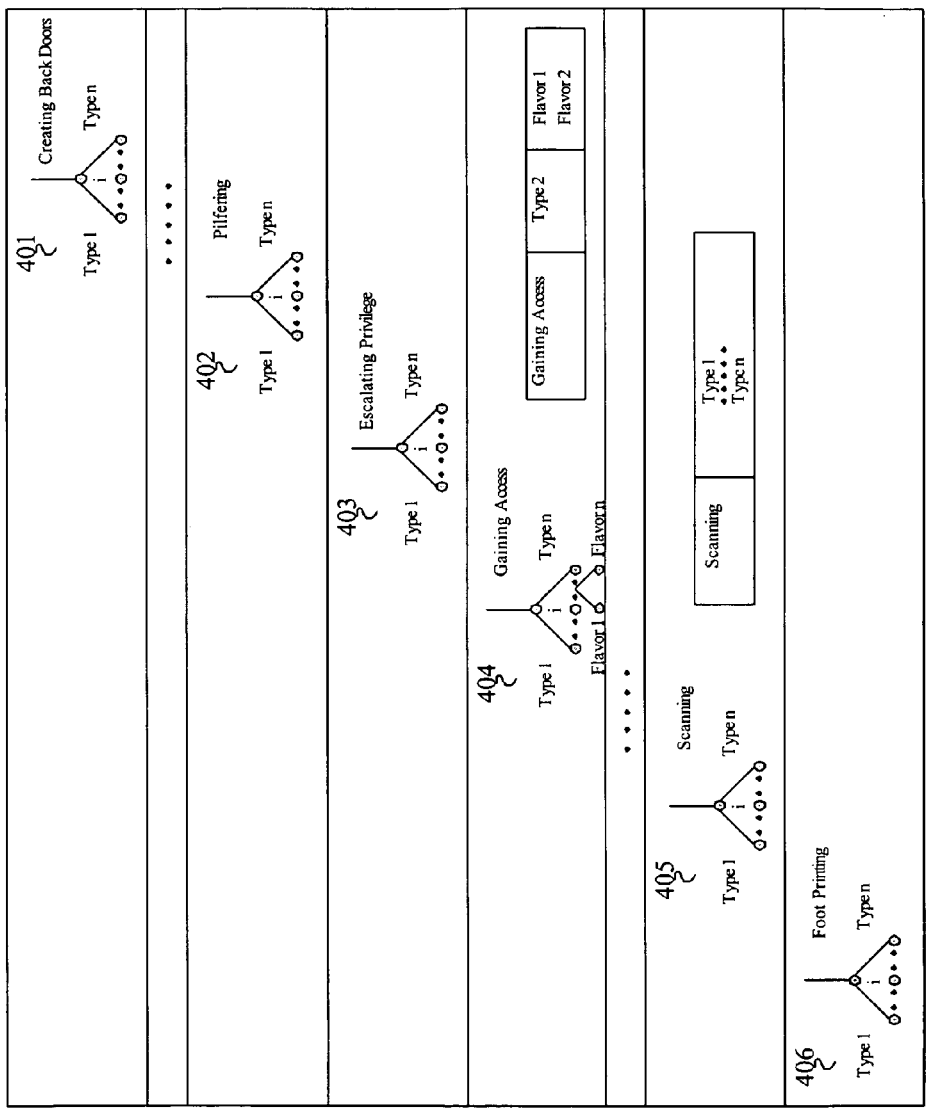
FIG. 4 shows an exemplary classification scheme for hacking methodologies presented in a tree structure according to the present invention.

The status of connections may be extracted from the information embedded in the IP shadow records. Using look-up tables, IP addresses can be easily transformed to represent communities of interest based on CIDR, ASN and Prefix designations. FIG. 3 presents a hypothetical visualization of a situation that juxtaposes the severity level of all connections in the Internet with a conceptual view of the interplay of techniques, tools, and data in cyber event capture according to the present invention. A grid 310 is presented which includes an x-axis 312 representing the source IP addresses and a y-axis representing the destination IP addresses. The grid 310 includes a plurality of bins 316 corresponding to the various source, destination pairs represented on the axes. The towers 320 at the intersection of the rows and columns formed by the bins 310 extend from a floor value and represent the maximum number of distinct properties observed in each bin. A translucent plane 330 representing the threshold is inserted. The threshold may be set based on empirical data from past operating experience or from theoretical values based on the compromising of specific components.

In the example of FIG. 3, three towers 320 are shown to exceed threshold 330, thereby showing the existence of (source, destination) pairs that are likely to be compromised from a security perspective. Thus, the visualization of FIG. 3 provides a system administrator with a visual indication of trouble spots within the network. The visualization of FIG. 3 captures the degree to which any monitored address in the Internet has been compromised. If at least one (source, destination) pair exceeds the threshold 330 for number of distinct properties observed in a bin 310 a tower 320 that exceeds the threshold 330 will capture that fact.

The severity meter 350 visualization captures the activity level embedded in the IP shadow records. The severity meter 340 increases as the number of distinct properties increase. Thus, when there is little or no activity as captured by IP shadow records, the head of the needle is horizontal and on the left side, corresponding to the floor. The needle will go up the scale as the activity level increases.

Thus, IP shadowing examines the content and metadata of the IP data stream and with the knowledge of hacking tools and usage patterns tries to organize tools, techniques, and data to determine the methodology in use. Different hackers are forced to use similar techniques and the behavior that IP shadowing must look for should be predictable and bounded for a particular vulnerability. When the number of observed distinct properties exceeds a threshold, it is more likely that connection has been compromised. If at least one (source, destination) pair exceeds the threshold for number of distinct properties observed in a bin, that fact will be captured in the proposed visualization. The exemplary embodiments take advantage of high quality associations in the IP data stream to identify malicious activity. The present invention has the benefits of increased security which is a concern for every one connected to Internet. Strategically, the present invention is applicable to all components of the Internet.

What is claimed is:

1. A system, comprising:
   a data stream receiving device receiving a data stream and separating the data stream into a plurality of independent data streams, the data stream including a plurality of packets, each packet including a source address and a destination address;
   a plurality of detectors, each detector receiving one of the independent data streams, each detector including a detection mechanism for a specific behavior, wherein each of the specific behaviors corresponds to an unwanted activity, each detector creating a record when the specific behavior is identified, the record including the source address and the destination address of the data packet in which the specific behavior was identified, the record further including a metric corresponding to a severity level of the specific behavior;
   an analysis module combining two of the records when the two records include the same source and destination addresses, the combination including summing the metrics of the two records; and
   a non-transitory storage medium storing the record.

2. The system of claim 1, wherein the plurality of detectors operate in parallel on the plurality of independent data streams.

3. The system of claim 1, wherein the plurality of detectors include one of a footprinting detector, a scanning detector, an enumeration detector, a gaining access detector, an escalating privilege detector, a pilfering detector, a covering tracks detector and a back door detector.

4. The system of claim 1, wherein the analysis module further compares the metric to a predetermined threshold.

5. The system of 4, further comprising:
   an indication module providing an indication to a user when the metric is greater than the predetermined threshold.

6. The system of claim 1, wherein the data stream is an IP data stream.

7. The system of claim 1, further comprising:
   a graphics module for producing a graphical representation of the records in the storage medium.

* * * * *